United States Patent
Reblin

(10) Patent No.: US 8,925,810 B2
(45) Date of Patent: Jan. 6, 2015

(54) METHODS AND SYSTEMS FOR INTERROGATING AND PROCESSING CODES

(75) Inventor: Gary C. Reblin, Falls Church, VA (US)

(73) Assignee: United States Postal Service, Washington, DC (US)

( * ) Notice: Subject to any disclaimer, the term of this patent is extended or adjusted under 35 U.S.C. 154(b) by 0 days.

(21) Appl. No.: 13/607,507

(22) Filed: Sep. 7, 2012

(65) Prior Publication Data

US 2013/0001298 A1 Jan. 3, 2013

Related U.S. Application Data

(62) Division of application No. 11/614,023, filed on Dec. 20, 2006.

(60) Provisional application No. 60/752,337, filed on Dec. 20, 2005.

(51) Int. Cl.
*G06K 15/00* (2006.01)
*G07G 1/00* (2006.01)
*G06Q 10/08* (2012.01)
*G06Q 20/32* (2012.01)
*G06Q 30/02* (2012.01)
*G06Q 30/06* (2012.01)

(52) U.S. Cl.
CPC .............. *G07G 1/0045* (2013.01); *G06Q 10/08* (2013.01); *G06Q 10/087* (2013.01); *G06Q 20/327* (2013.01); *G06Q 20/3278* (2013.01); *G06Q 30/02* (2013.01); *G06Q 30/06* (2013.01); *G07G 1/009* (2013.01)
USPC ......................................................... 235/383

(58) Field of Classification Search
CPC ...... G06Q 30/06; G06Q 20/20; G07G 1/0054
USPC ........................................................... 235/383
See application file for complete search history.

(56) References Cited

U.S. PATENT DOCUMENTS 5,250,789 A * 10/1993 Johnsen ..................... 705/14.23
5,424,524 A 6/1995 Ruppert et al.
(Continued)

FOREIGN PATENT DOCUMENTS

WO WO 2004/080097 A1 9/2004
WO WO 2005/003926 A2 1/2005

OTHER PUBLICATIONS

ToolWatch Visibility, Product Sheet for Nextel Mobile Phone Scanner AC25, http://www.toolwatch.com/accessories_scanning_ac25.htm, printed Apr. 7, 2011.

(Continued)

*Primary Examiner* — Rafferty Kelly
(74) *Attorney, Agent, or Firm* — Knobbe, Martens, Olson & Bear LLP

(57) ABSTRACT

An interrogating and processing system and method is described. A wireless communication device interrogates an information source, having a barcode or tag, and wirelessly transmits data indicative of the information source. The interrogator can be built into or adjunct to the wireless communication device. An automated processing subsystem receives the transmitted data and identifies an item corresponding to the data. A fulfillment subsystem effects delivery of the item to a destination. There can be a coupon code scanning and processing system and method. A wireless computing device having an interrogator reads a coupon code. An automated processing subsystem receives the corresponding data and provides a benefit associated with the coupon. The benefit can be a discount on a product or service. Alternatively, at least a portion of the coupon including a code is displayed on a screen of the computing device for processing at a point of sale terminal.

27 Claims, 11 Drawing Sheets

(56) References Cited

U.S. PATENT DOCUMENTS

| | | | |
|---|---|---|---|
| 6,230,143 B1* | 5/2001 | Simons et al. | 705/14.25 |
| 6,629,642 B1 | 10/2003 | Schwartz et al. | |
| 7,006,993 B1* | 2/2006 | Cheong et al. | 705/38 |
| 7,308,254 B1* | 12/2007 | Rissanen | 455/414.1 |
| 7,558,380 B2 | 7/2009 | DiVenuta et al. | |
| 2001/0052545 A1 | 12/2001 | Serebrennikov | |
| 2002/0065728 A1 | 5/2002 | Ogasawara | |
| 2002/0169662 A1* | 11/2002 | Claiborne | 705/14 |
| 2003/0015451 A1* | 1/2003 | Sencer et al. | 206/521.1 |
| 2005/0045728 A1 | 3/2005 | Kargman | |
| 2005/0171841 A1 | 8/2005 | Prorock et al. | |
| 2005/0184160 A1 | 8/2005 | Steinmetz et al. | |
| 2005/0225076 A1* | 10/2005 | McCreary et al. | 283/56 |
| 2005/0236480 A1 | 10/2005 | Vrotsos et al. | |
| 2005/0286463 A1 | 12/2005 | Matsumoto | |
| 2006/0180647 A1 | 8/2006 | Hansen | |
| 2009/0012885 A1 | 1/2009 | Cahn | |

OTHER PUBLICATIONS

International Application No. PCT/US 06/48920, mailed on Oct. 26, 2007, 2 pgs.

\* cited by examiner

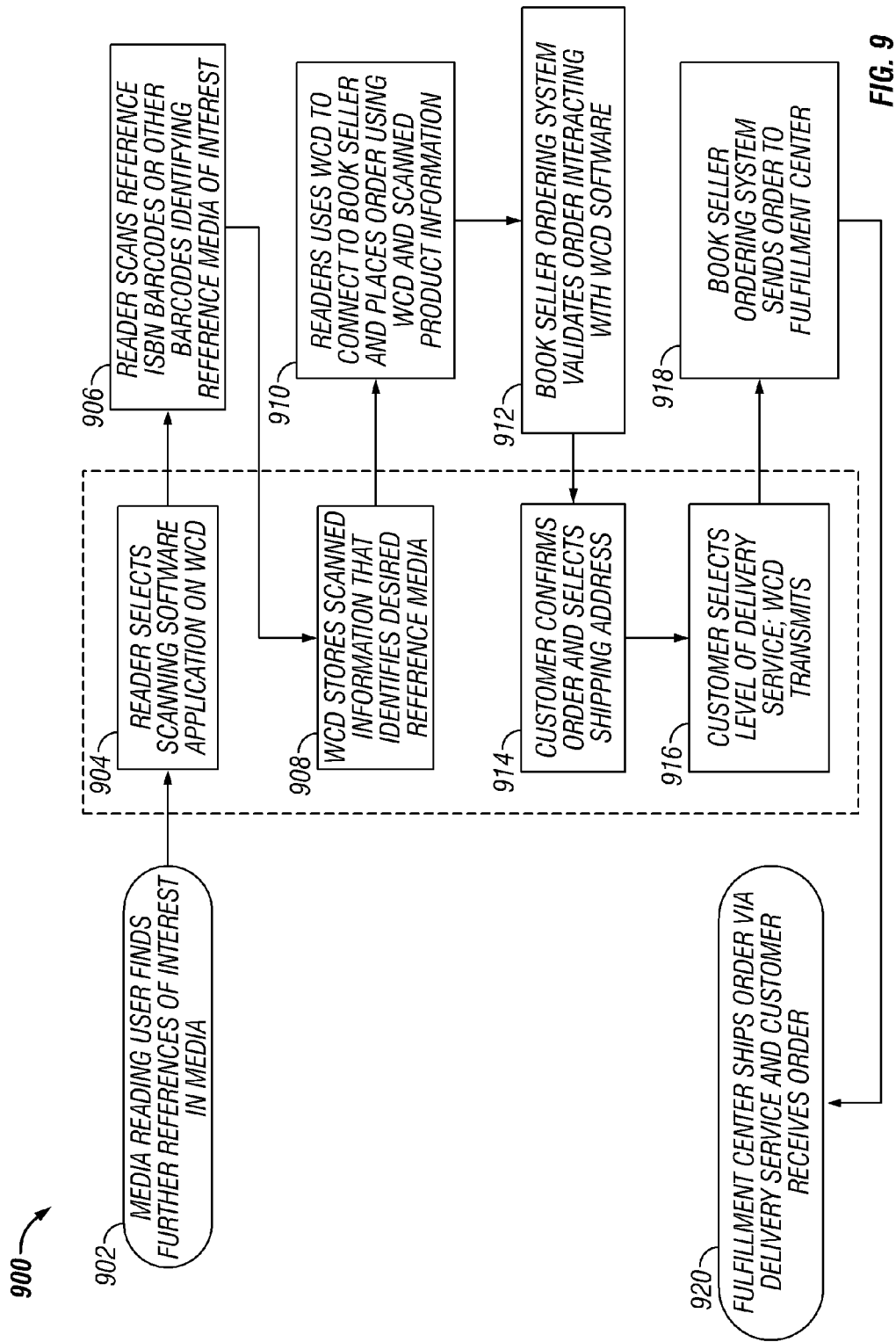

METHODS AND SYSTEMS FOR INTERROGATING AND PROCESSING CODES

CROSS-REFERENCE TO RELATED APPLICATIONS

This application is a divisional of U.S. patent application Ser. No. 11/614,023 filed Dec. 20, 2006, and entitled "Method and System for Interrogating and Processing Codes" which claims the benefit under 35 U.S.C. §119(e) of U.S. patent application Ser. No. 60/752,337 filed Dec. 20, 2005, and entitled "Method and System for Barcode Scan and Order", each of which are hereby incorporated by reference in their entirety.

BACKGROUND OF THE INVENTION

1. Field of the Invention

The invention relates to processing coded information, and more particularly, to transmitting barcode information from a wireless device for subsequent processing.

2. Description of the Related Art

Barcode devices are used in retail stores at a point of sale (POS) system to identify products that are being purchased by a consumer. Other areas where barcode scanners are used include inventory, shipping and receiving, and fixed asset tracking. Barcode scanners may be separate devices or may be integrated into a portable data terminal that can store multiple barcode data. In either case, the scanner or terminal can be tethered to a host computer via a cable for providing the barcode data. The data terminal can alternatively be docked periodically in a cradle having a connection to the host computer for providing the data, or can communicate via a wireless local area network (WLAN), Bluetooth or Infrared with the host computer.

SUMMARY OF THE EMBODIMENTS OF THE INVENTION

In one embodiment, there is a scanning and ordering system, comprising a wireless communication device having a scanner configured to scan an information source and wirelessly transmit data indicative of the information source, an automated processing subsystem configured to receive the transmitted data and identify an item corresponding to the data, and a fulfillment subsystem configured to receive information from the automated processing subsystem and to effect delivery of the item to a destination.

The wireless communication device may be configured to store shipping address data and/or payment information data and/or delivery preference data in a data storage. The information source may comprise a barcode. The scanner may scan an information source representative of a shipping address and may wirelessly transmit data indicative of the shipping address. The scanner may scan an information source representative of a delivery preference and may wirelessly transmit data indicative of the delivery preference. The scanner may scan an information source representative of an item quantity and may wirelessly transmit data indicative of the item quantity. The scanner may scan an information source representative of an item size and/or item color and may wirelessly transmit data indicative of the item size and/or item color. The scanner may scan an information source representative of payment information and may wirelessly transmit data indicative of the payment information. The scanner may scan an information source representative of a telephone number associated with the automated processing subsystem and may wirelessly transmit data indicative of the telephone number associated with the automated processing subsystem.

The information source may comprise a telephone number associated with the automated processing subsystem. The wireless communication device may comprise an input device configured to provide additional data to be transmitted to the automated processing subsystem. The wireless communication device may comprise an input device configured to provide additional data to be stored in a data storage. The wireless communication device may transmit data via a cellular or personal communications service protocol. The destination may be to a user of the wireless communication device and/or to a third party.

The wireless communication device may be a mobile cellular or personal communications service telephone having a persistent data storage. The wireless communication device may be a laptop computer, mobile computer, palm-top computer, hand-held computer, or personal digital assistant. The scanner may be built into the wireless communication device or adjunct to the wireless communication device.

The automated processing system may use interactive voice response technology. The automated processing system may request the wireless communication device to provide additional information about the item. The automated processing system may request delivery preferences from the wireless communication device. The automated processing system may provide a price total to the wireless communication device. The automated processing system may request payment information from the wireless communication device. The automated processing system may send confirmation information to the wireless communication device or other predetermined location.

The fulfillment subsystem may ship the item via the delivery preference provided by the automated processing system. The fulfillment subsystem may ship the item via the United States Postal Service.

In another embodiment, there is a scanning and ordering method using a wireless communication device having an interrogator, the method comprising scanning an information source via a wireless communication device, transmitting data indicative of the information source via a wireless protocol, receiving the transmitted data at an automated processing subsystem, identifying an item corresponding to the data, and delivering the item to a destination. The interrogator may comprise a scanner. The information source may comprise a barcode.

In another embodiment, there is a coupon code scanning and processing system, comprising a wireless computing device having a scanner configured to scan a coupon code and store data indicative of the coupon code, and an automated processing subsystem configured to receive the data via a wireless protocol from the wireless computing device and provide the benefit associated with the coupon corresponding to the data.

The coupon may correspond to a retail product. The code may comprise a barcode. The wireless computing device may have a mobile wireless cellular or personal communications service telephone capability. The automated processing subsystem may be a point of sale terminal or a coupon kiosk. The scanning of the coupon may be performed outside of a business having the automated processing subsystem, or may be performed at a location of a product or service in a business. The scanning of the coupon may be performed on an electronic display of a coupon. The coupon may comprise a code. The automated processing subsystem may be located in a retail business location. The wireless computing device may notify the user of the device of applicable coupons. The wireless computing device transmits the data to the automated processing subsystem via a Bluetooth or infrared protocol, or via a cellular or personal communications service protocol. The benefit may be a discount on a product or service.

In another embodiment, there is a coupon code scanning and processing method using a mobile computing device having a scanner, the method comprising scanning a coupon code via the mobile computing device, storing data indicative of the coupon code in the mobile computing device, transmitting the data to an automated processing subsystem via a wireless protocol, and providing a benefit associated with the coupon corresponding to the data. The benefit may be a discount on a product or service. The code may comprise a barcode.

In another embodiment, there is a coupon barcode scanning and processing method using a mobile computing device having a scanner and a display screen, the method comprising scanning a coupon barcode via the mobile computing device, storing data indicative of the coupon barcode in the mobile computing device, displaying at least a portion of the coupon including the barcode on a screen of the mobile computing device, and providing a benefit associated with the displayed at least portion of the coupon at a point of sale terminal. The benefit may be a discount on a product or service.

In another embodiment, there is a coupon code scanning and processing system having a mobile computing device, the system comprising means for scanning a coupon code, means for storing data indicative of the coupon code in a mobile computing device, means for transmitting the data to an automated processing subsystem via a wireless protocol, and means for providing a benefit associated with the coupon corresponding to the data.

In yet another embodiment, there is a interrogation and processing system, comprising a wireless communication device having an interrogator configured to read an information source and wirelessly transmit data indicative of the information source, and an automated processing subsystem configured to receive the transmitted data, identify an item corresponding to the data, and provide a response to the wireless communication device based on the item.

The information source may include a barcode that is decoded by the wireless communication device and converted to a uniform resource locator (URL) address. The URL address may be indicative of a web page listing a product or service on a website. Alternatively, the URL address may be indicative of a web page having a coupon for a product or service on a website. The automated processing subsystem may include a server configured to receive the data indicative of the information source, decode the data and convert the decoded information to a URL address. The interrogator may read a bitmap of a URL address corresponding with the information source, and the wireless communication device may convert the bitmap to an encoding scheme representative of the URL address via optical character recognition. The response may comprise a receipt for a product or service corresponding to the item, or the response may comprise a coupon for a product or service corresponding to the item. The information source may include a barcode indicative of a geographic location of the information source and a telephone number of a transportation entity so as to obtain transportation services, and the response may comprise an acknowledgement of a transportation pickup. The information source may include an active radio frequency identification tag configured to limit a particular business to a specified number of total coupon readings. The information source may include an active radio frequency identification tag configured to limit the wireless communication device to one reading for a particular coupon. The system may additionally comprise a fulfillment subsystem configured to receive information from the automated processing subsystem and to effect delivery of the item to a destination.

BRIEF DESCRIPTION OF THE DRAWINGS

FIG. 9 is a flowchart of an exemplary process for operating the embodiment shown in FIG. 8.

DETAILED DESCRIPTION OF CERTAIN EMBODIMENTS

Figure 1:
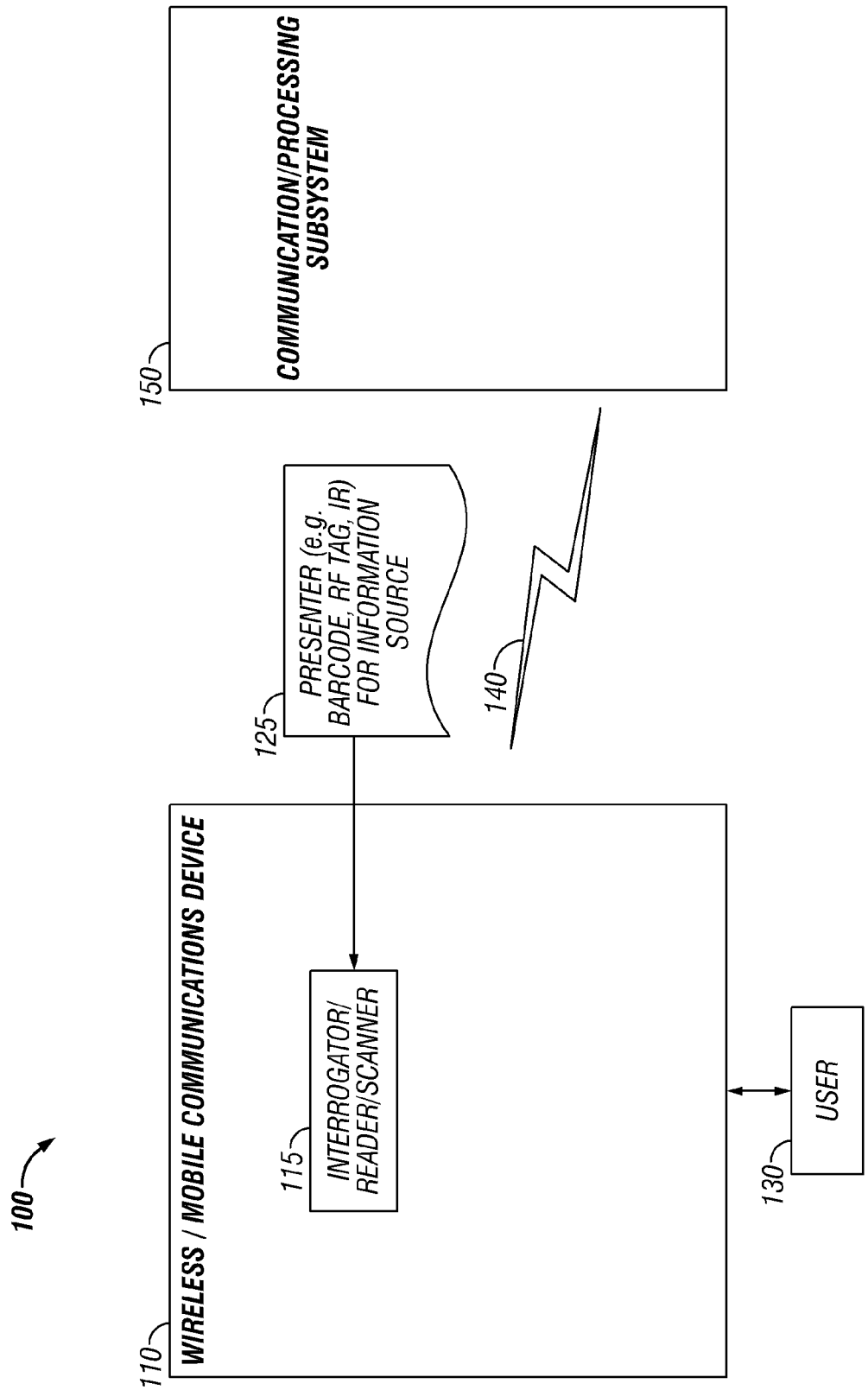
FIG. 1 is a block diagram of an embodiment of an interrogator and processing system having a wireless communication device.

The following detailed description of certain embodiments presents various descriptions of specific embodiments of the invention. However, the invention can be embodied in a multitude of different ways.

The terminology used in the description presented herein is not intended to be interpreted in any limited or restrictive manner, simply because it is being utilized in conjunction with a detailed description of certain specific embodiments of the invention. Furthermore, embodiments of the invention may include several novel features, no single one of which is solely responsible for its desirable attributes or which is essential to practicing the embodiments herein described.

The system is comprised of various modules, tools, and applications. As can be appreciated by one of ordinary skill in the art, each of the modules may comprise various sub-routines, procedures, definitional statements and macros. Each of the modules are typically separately compiled and linked into a single executable program. Therefore, the following description of each of the modules is used for convenience to describe the functionality of the preferred system. Thus, the processes that are undergone by each of the modules may be arbitrarily redistributed to one of the other modules, combined together in a single module, or made available in, for example, a shareable dynamic link library.

The system modules, tools, and applications may be written in any programming language such as, for example, C, C++, BASIC, Visual Basic, Pascal, Ada, Java, HTML, XML, or FORTRAN, and executed on an operating system, such as variants of Windows, Macintosh, UNIX, Linux, VxWorks, PalmOS, PocketPC, Symbian, Java-based or other operating system. C, C++, BASIC, Visual Basic, Pascal, Ada, Java, HTML, XML and FORTRAN are industry standard programming languages for which many commercial compilers can be used to create executable code.

The general concept of interrogation and processing, and in certain embodiments, barcode scan and order (BSO) is as follows. A user with a wireless communication device, having a way to interrogate or interactively read one or more codes or information sources, can perform one or multiple transactions with other systems, subsystems or applications. The wireless communication device can communicate, for example, via telecommunications, a global computerized network such as the Internet, Radio Frequency (RF), or Infrared. In certain embodiments, a user with an imaging/scan-enabled cellular or personal communication service (PCS) telephone and wireless communications can scan multiple barcodes found in written materials (e.g., magazines, newspapers, pamphlets, catalogs, posters, etc.), on products, on signage, or labels to perform one or multiple transactions with other systems or applications. A barcode is a machine readable representation of information in a visual format on a surface. Various types of barcodes include linear barcodes, stacked barcodes and 2D or matrix barcodes, which can be circular, four state or even dataglyphs. Other ways and types of coding information are envisioned for use with BSO. For the sake of convenience in this description, other coding schemes will also be referred to as barcodes. Embedded in these barcodes is a variety of information. With BSO, the scan-enabled cell phone becomes a mini-computer with a powerful in-the-hand input-output device that can perform a variety of transactions including:

Downloading a telephone number and associated business address embedded within the barcode;

Placing product orders by scanning a series of barcodes that include the number to call, specifying product characteristics and arranging for mailing;

Using the scan-enabled cell phone capabilities in conjunction with barcode labels as an input/output access device, for example to store discount coupon data that a customer uses for in-store redemption or for mail-in rebates.

Referring to FIG. 1 (and also FIGS. 2, 4, 6 and 8), an embodiment of an interrogator and processing system 100 having a wireless communication device 110 will be described. The wireless communication device 110 is operated by a user 130 and can include a reader- or scanner-enabled cellular or PCS telephone or a portable computing device having Bluetooth, infrared or a similar communication capability. The technology utilized can include cellular or PCS telephones with readers, scanners, or interrogators 115 (herein forward collectively referred to as scanners), a variety of wireless communications protocols and custom-built or off-the-shelf applications. The scanner 115 can be built into or can be adjunct to the telephone or computing device. For example, a Motorola i355 cell phone with a Motorola AC25 scanner can be used in certain embodiments. In other embodiments, such as for Scenario 3 (described in conjunction with FIGS. 6 and 7), the portable computing device may be any processor controlled device that permits external access (to other computing devices), including laptop computers, mobile computers, palm-top computers, hand-held computers, personal digital assistants, interactive or web-enabled wireless communications devices, mobile web browsers, or a combination thereof. In other embodiments, the scanner 115 can interrogate an active or passive radio frequency identification (RFID) tag, or the scanner can receive data from an information source via infrared communication. The information source having data associated with a barcode, RFID tag or provided via infrared communication can be considered to be a presenter 125.

The scanner 115, for example, can scan barcodes found in information sources such as written materials (e.g., magazines, newspapers, pamphlets, catalogs, posters, etc.), on products, on signage or labels, and so forth. The barcodes can represent information such as universal product code (UPC), price, quantity, product or service detail such as color or style, telephone number of an automated call center, URL or similar address, coupon or certificate information, and so forth. Alternatively, the information may be obtained by the scanner 115 via radio frequency or infrared communication. The obtained information can be stored in the wireless communication device 110 and subsequently transmitted via wireless communication 140 to a communication and processing subsystem 150. In another embodiment, the information is not stored in the wireless communication device 110, but is transmitted to the communication and processing subsystem 150. The communication and processing subsystem 150 includes a transmitter and receiver for wireless communication with the wireless communication device 110. The processing subsystem 150 can store the information received from the wireless communication device 110 or can store a processed version of the received information. The storage of the information at the wireless communication device 110 and/or the processing subsystem 150 will be described herein below. In certain embodiments, the processing subsystem 150 provides a response to the wireless communication device 110, such as, for example, an acknowledgement and/or a receipt for an order for a product or service, or a coupon or certificate for a product or service. The processing subsystem may also provide instructions for shipment of a product corresponding to the received information to the user 130 or to another party identified by the user.

Figure 2:
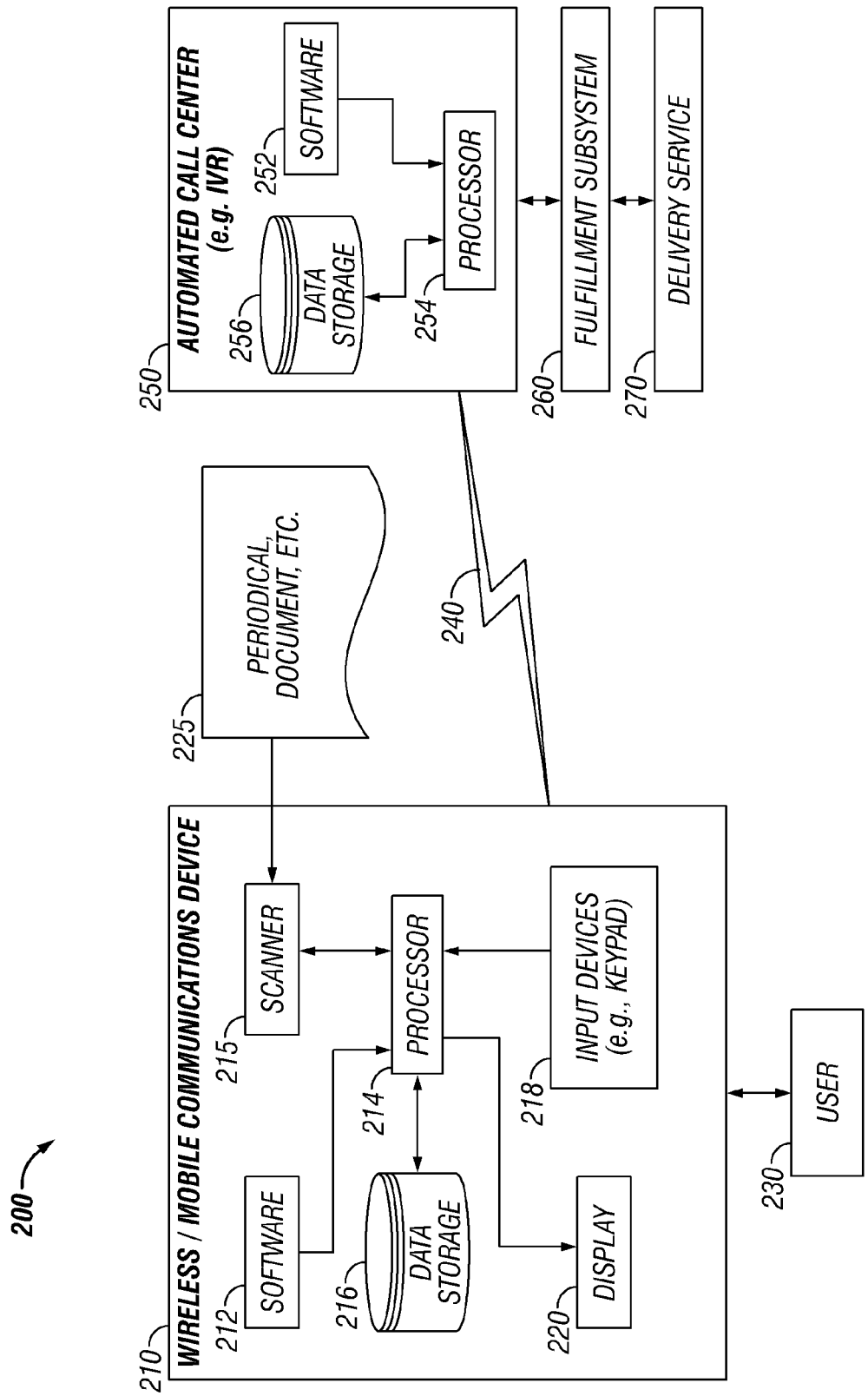
FIG. 2 is a block diagram of a catalog barcode scan and ordering embodiment of the system and method.

Presented below are examples of different scenarios of the system 100 in operation. These scenarios utilize a scan-enabled cellular or PCS telephone (all example Scenarios) or a portable computing device having Bluetooth, infrared or a similar communication capability (such as for example the third scenario associated with FIGS. 6 and 7). Referring to FIG. 2, an example system 200, such as to illustrate a first scenario, will be described. A wireless computing device 210 utilized by a user 230 can include one or more input devices 218 such as a keyboard, mouse, touch pad, joystick, pen-input-pad, and the like. The computing device can also include an output device, such as a visual display 220 and an audio output (not shown). In certain embodiments, the cellular or PCS telephone and the computing device can both include a processor 214, the display 220, one or more input devices 218, a scanner 215 for barcodes and the like, software 212 stored in a memory, and a persistent data storage 216. In other embodiments, another type of interrogator of an information source can be used. The persistent data storage 216 can store barcode data 225 that is scanned, which can include product information (e.g., part number, size, color, quantity, etc.), shipping preferences, address information, payment information, and so forth. The persistent data storage can also store data that is entered via one of the input devices (e.g., keypad).

The wireless communication device 210 communicates the data indicative of the scanned information of the information source via wireless communication 240 to an automated call center (ACC) 250, such as using interactive voice response (IVR) system in certain embodiments. The ACC 250 includes a processor 254 that operates using software 252 and data from a data storage 256 and/or from the wireless connection 240. The ACC 250 provides information to a fulfillment subsystem 260 so as to effect the delivery of one or more products corresponding to the information received by the ACC via a delivery service 270. In certain embodiments, the delivery service is the U.S. Postal Service.

Example database fields and data types that can be used in a database of the wireless communication device data storage 216 and/or the ACC data storage 256 are as follows:

Scan_Date—Wireless Communication Device (WCD) registered date the Product Code is scanned. Stored in the date format MM/DD/YEAR.

Scan_Time—WCD registered time the Product Code is scanned. Stored in the time format HH:MM:SS.

Product_Code—UPC product code as defined in uniform commercial code (UCC) UPC specifications or a custom product code for this application. Stored as a text field.

Price—Price code or actual price associated with the product. Stored as text field.

Qty—Quantity code or actual quantity of product desired. Stored as text field.

Product_Detail_1—Optional product detail selection. Stored as text.

Product_Detail_2—Optional product detail selection. Stored as text.

Product_Detail_3—Optional product detail selection. Stored as text.

Discount Code—Discount code or actual discount associated with product. Stored as text.

ACC_Dial_Code—Phone number or other communication address for accessing an ACC. Stored as number.

Upload_Status—Record status indicator used for WCD request status and database maintenance. Stored as text.

Payment_Information—Stored as number.

The database may or may not be relational and can be customized for each application, such as for the four scenarios described herein. There are several options for wireless handheld database management software. For this application, one could utilize a preconfigured database, have the database custom coded, or use an intermediate method where a software development tool is used to create a customizable database. In certain embodiments, the intermediate method is utilized, where the solution used is somewhat dependant on the operating system (OS) used. Two common handheld operating systems are Windows CE and Palm OS. Several possibilities for intermediate methods include:

SQL Server CE

Access CE

SmartList To Go (DataViz, Inc.)

HanDBase (DDH Software, Inc.)

MobileDB4 options MobileDB-Excel or MobileDB-Access

A customized application of Splash Shopper could also be used with the Palm OS.

Several possible protocols could be used for wireless communication device uploads to the ACC. In one embodiment, the Wireless Application Protocol (WAP) is emerging as the dominant standard in the wireless data transmission protocols market segment and can be utilized for the data transmission. Other potential alternatives include a Mobile Station Application Execution Environment (MExE) and a Subscriber Identity Module (SIM) Application Toolkit.

Figure 3:
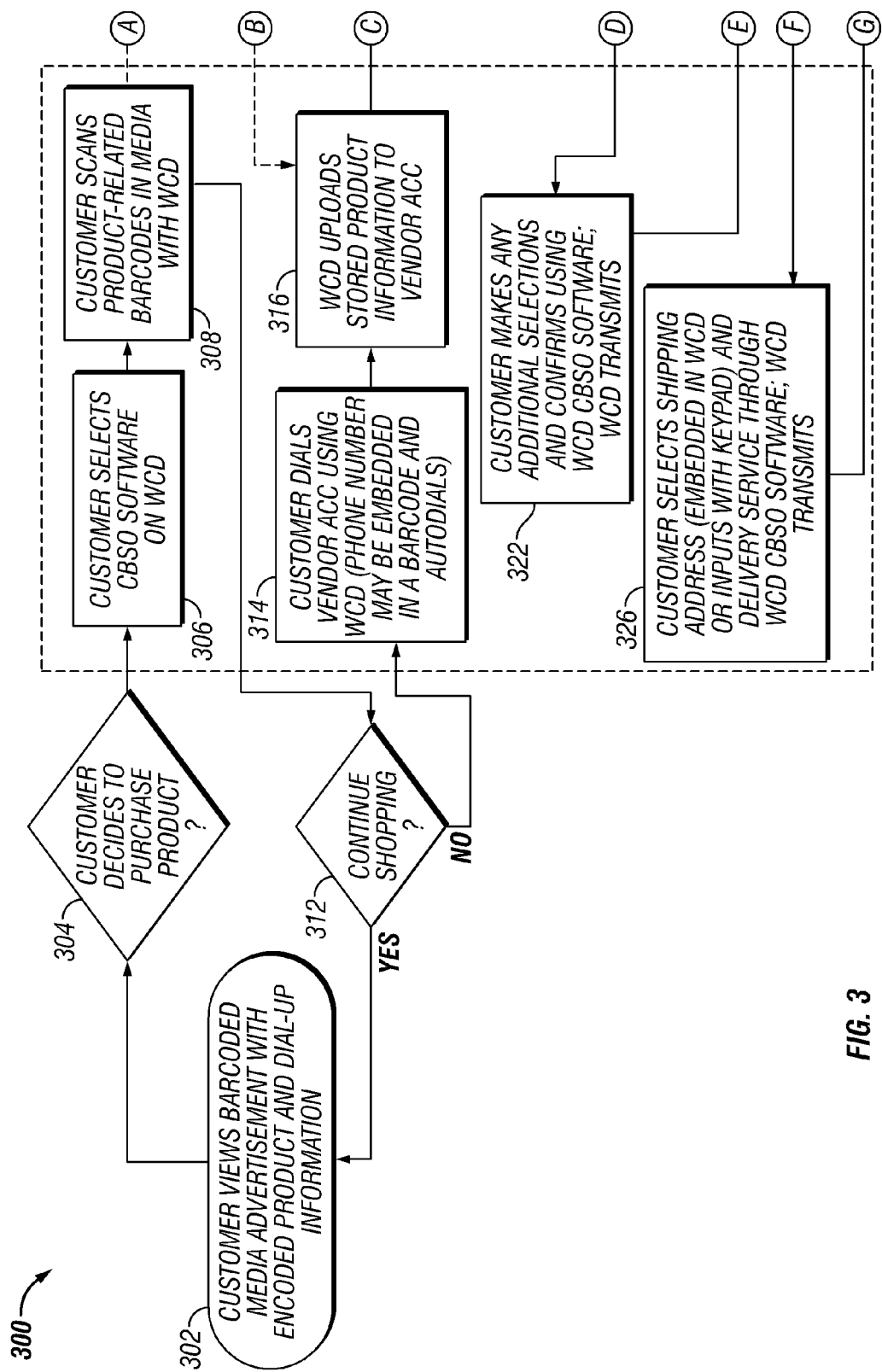
FIG. 3 is a flowchart of an exemplary process for operating the embodiment shown in FIG. 2.
Figure 3:
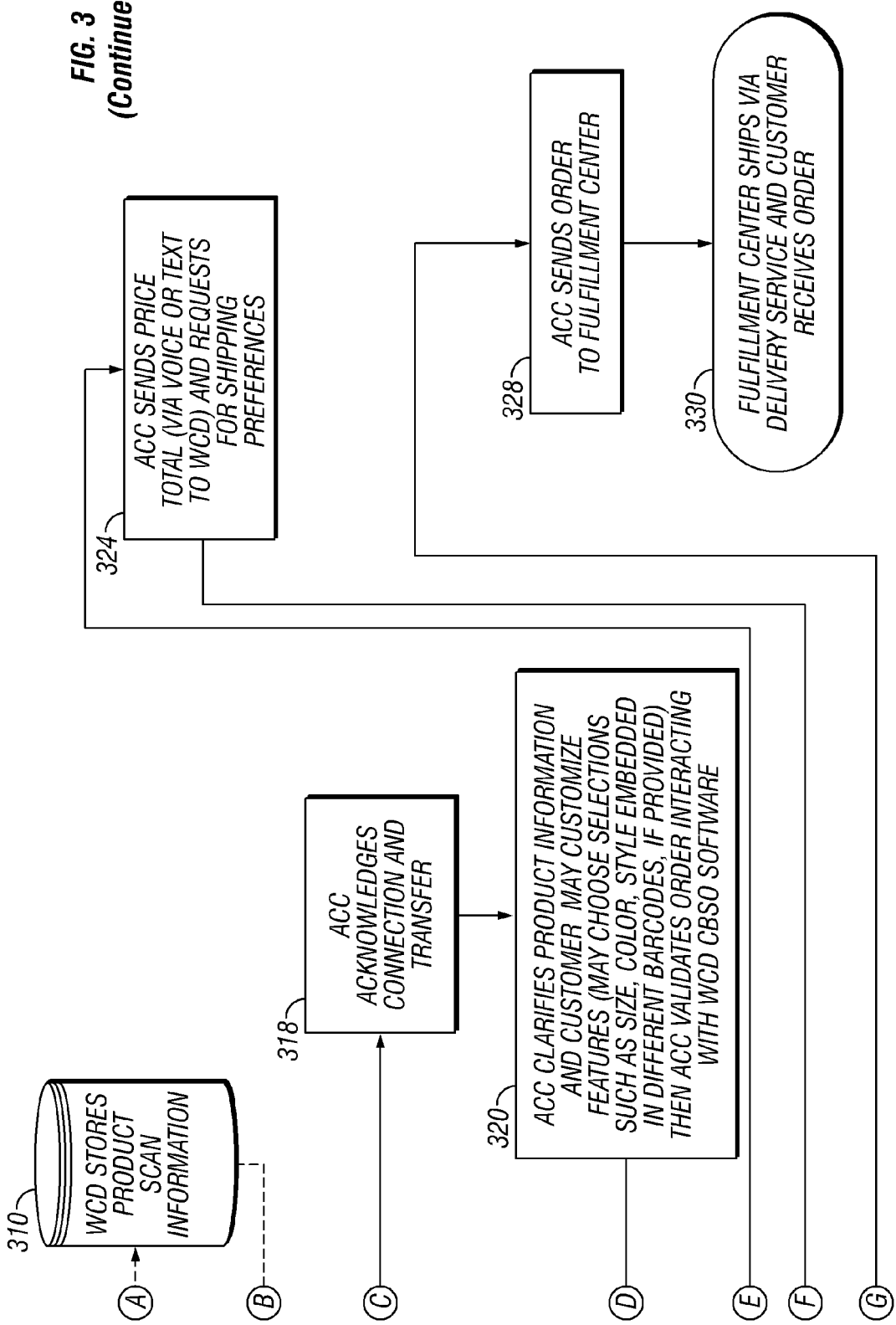

Referring to FIG. 3, a flowchart of an exemplary process 300 for operating the example system shown in FIG. 2 will be described. In the first scenario, the system 200 (FIG. 2) performs the process 300 for delivery of a product. The person, customer or user 230 has a magazine or other hardcopy document (delivered to their home via mail or from other source such as a newspaper insert). The person observes a product he or she wants to purchase in a magazine advertisement at state 302 and decides to make a purchase at state 304. The person sees that the product is scan ordering-enabled. This could mean there is:

i. A barcode embedded with a 1-800 or other number to call to place the order;

ii. A product barcode(s);

iii. Barcodes that represent size, colors or other product customization choices.

The person activates their cell phone and selects catalog barcode scan and order (CBSO) software at state 306. Proceeding to state 308, the customer scans one or more product-related barcodes and the wireless communication device can optionally stores the scanned information in a data storage 310, such as data storage 216 (FIG. 2). Process 300 continues at a decision state 312 to determine if the person desires to continue shopping. If so, the process 300 moves to state 302 where the states 302 to 308 can be repeated for another product. If it is determined that person has completed selecting products, process 300 advances to state 314 where a barcode for the telephone number or other communication address of the ACC is scanned, or the person may optionally dial the telephone number associated with the ACC. Proceeding to state 316, the wireless communication device uploads the optionally stored product information in storage 310 to the ACC. At state 318, the ACC answers and recognizes the call as a catalog scan order, and acknowledges the connection and transfer of data. In certain embodiments, the user does not scan the desired product barcodes until this point of the process, such as when the data storage 310 is not used. Proceeding to state 320, while responding to a series of commands, such as instructions for scanning one or more codes, and using the keypad and barcodes, the person scans their selected product information and customizes as needed. The customization can include size, color, styles and so forth. The ACC confirms with the person that their order request is correct. Advancing to state 322, the person can make changes as needed and confirms the order.

Moving to state 324 of process 300, the ACC acknowledges the correct order, sends a price total or receipt information to the person and requests shipping information. At state 326, the person selects their shipping address or address barcode from a list of existing addresses within their cell phone, scans the barcode on the magazine - if it is theirs, or creates a new address that can be stored in the cell phone. The ACC prompts the person for a United States Postal Service (USPS) or other delivery service request (overnight, two day, parcel, etc.). The person makes a selection (the advertisement may include barcodes that represent the mailing options which the user can scan). The ACC recognizes and verifies where to ship the order. The ACC system handles the financial transaction to pay for the product and the shipping via credit card, electronic funds transfer or other means. The process may use a barcode on a credit card, a programmed number or other source that is transmitted from the cell phone to the ACC as the payment. This transaction includes a high level of security incorporated into the cell phone and ACC application. Upon completion of the transaction, the ACC provides a tracking number and/or a receipt or other response to the person's cell phone or other predetermined location(s) and the transaction ends. Proceeding to state 328, the ACC sends the order to a fulfillment center 260 (FIG. 2). The fulfillment center ships via the selected delivery service 270 at state 330 and the customer receives the ordered product(s). The ACC business may choose to send an acknowledgment card to the person thanking them for their business, confirming the order, etc.

Figure 4:
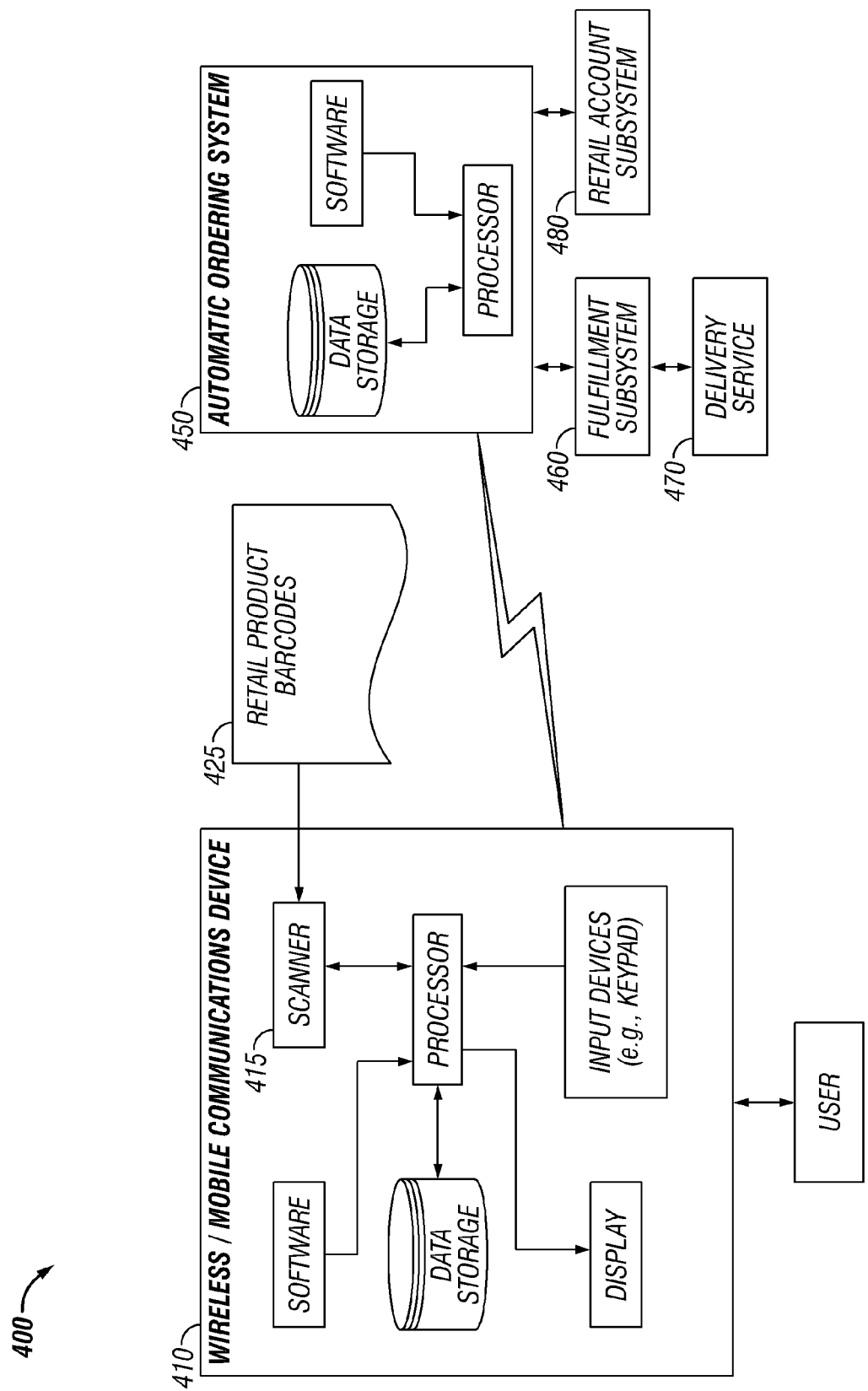
FIG. 4 is a block diagram of a product barcode scan and ordering embodiment of the system and method.

Referring to FIG. 4, an example system 400, such as to illustrate a second scenario, will be described. A wireless computing device 410 utilized by a user includes a scanner 415 used to scan retail product barcodes 425 or other similar information. Other components of the wireless communication device 410 are similar to that described in conjunction with the wireless communication device 210 of FIG. 2. The wireless communication device 410 communicates the data indicative of the scanned information of the information source, such as retail products, via wireless communication to an automatic ordering system (AOS) 450. The AOS 450 receives the data from the wireless communication device 410 and processes the data. The AOS 450 provides information to a fulfillment subsystem 460 so as to effect the delivery of one or more products corresponding to the information received by the AOS via a delivery service 470. In certain embodiments, the delivery service is the U.S. Postal Service. The AOS 450 is also in communication with a retail account subsystem 480.

Figure 5:
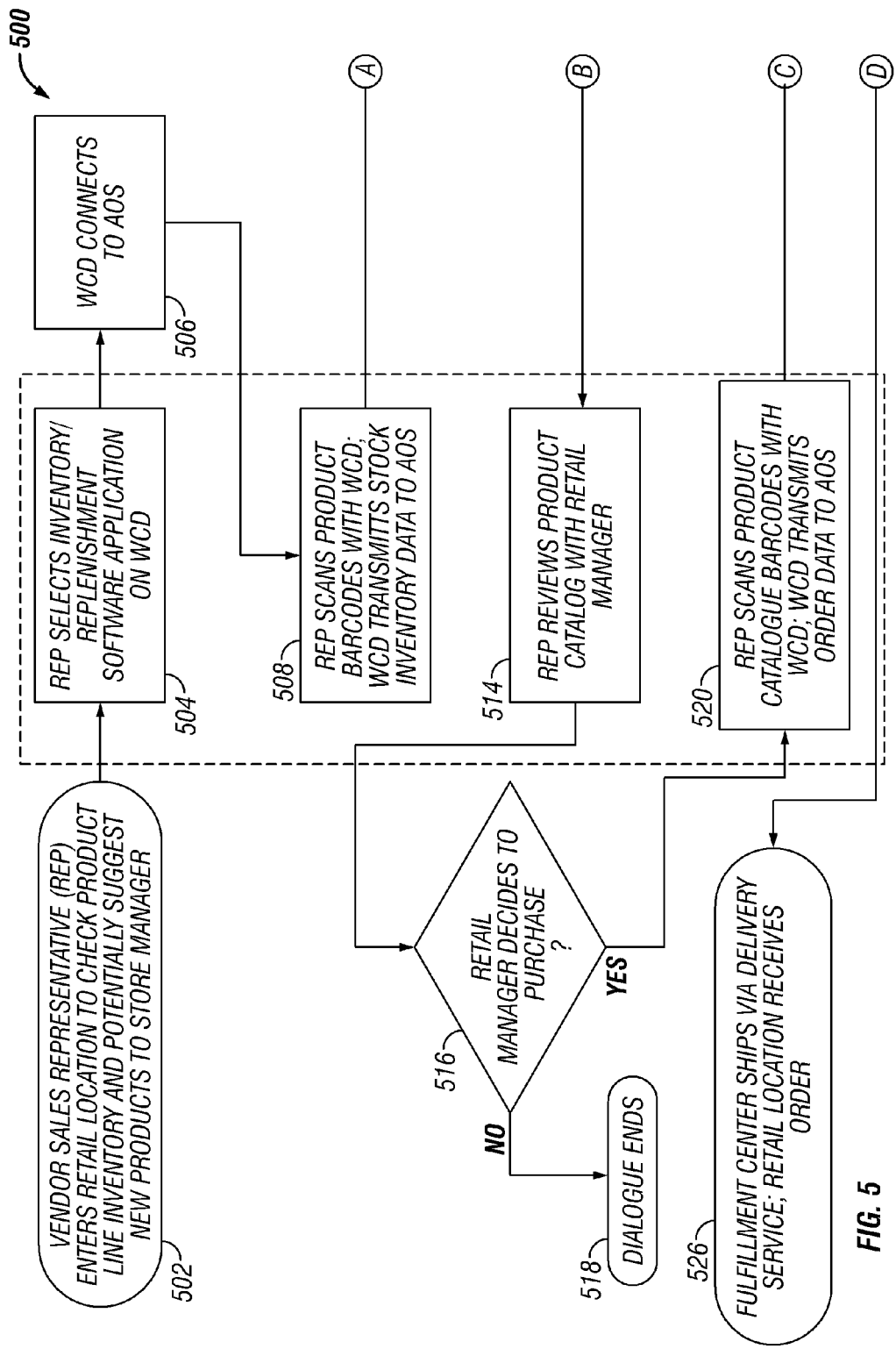
FIG. 5 is a flowchart of an exemplary process for operating the embodiment shown in FIG. 4.
Figure 5:
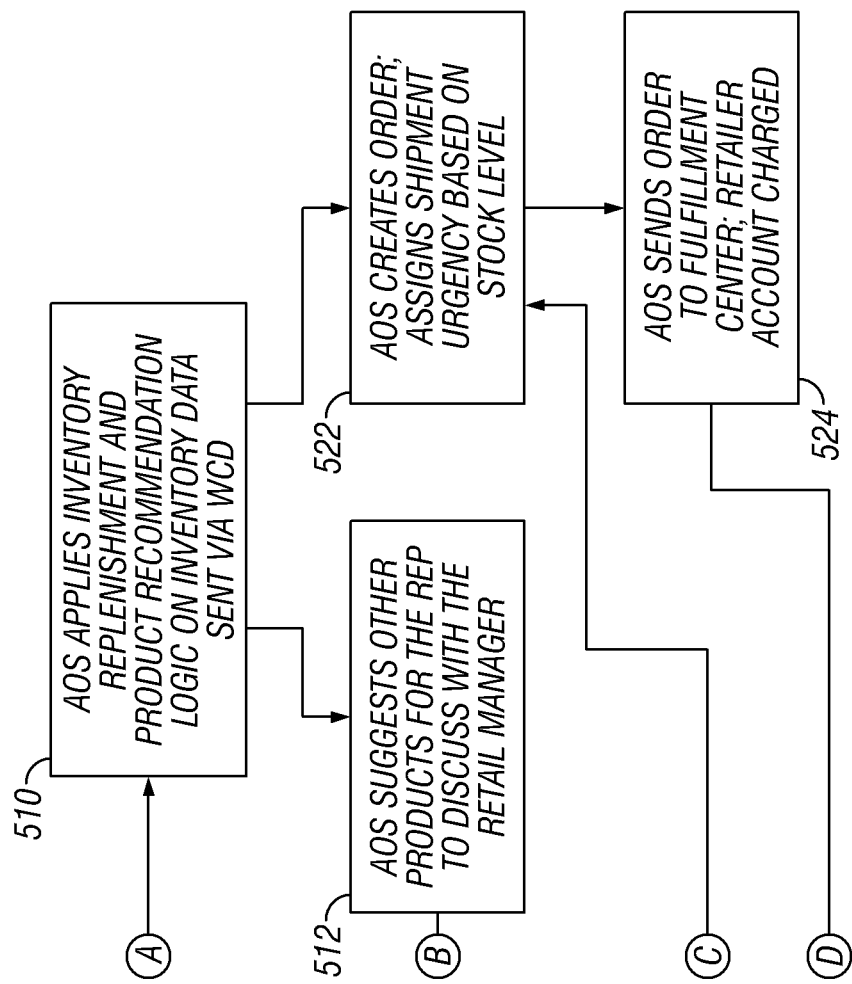

Referring to FIG. 5, a flowchart of an exemplary process 500 for operating the example system shown in FIG. 4 will be described. In the second scenario, the system 400 (FIG. 4) performs the process 500 for inventory control applications including the delivery of products to a business, for example.

Beginning at state 502, a sales representative (rep) enters a location having an inventory of products such as a specialty shop to check inventory status of multiple products and potentially suggest new products to store management. Moving to state 504, the rep selects an inventory/replenishment software application on the wireless communication device 410 (FIG. 4). Using his/her cell phone, the rep calls their company's AOS to connect to the AOS at state 506 and provide information notifying the company of the inventory at the store. The rep also obtains instant feedback on what to suggest to the store manager to purchase based on previous sales.

Advancing to state 508, the rep uses his/her scan-enabled cell phone to scan the barcodes of each type of product on the shelves (the process of scanning products on the shelves is a well-known operation). In certain embodiments, the cell phone immediately transmits the information to the AOS. In other embodiments, the cell phone could accumulate information and then send the information as a batch or bulk message to the AOS. Proceeding to sate 510, the AOS determines the appropriate order information by actions such as running a comparison of the inventory with the same time of last year's stock levels, or with some other measurement criteria, and based on a preexisting agreement with the specialty shop, the AOS places a restocking order at state 522. The AOS starts a subprocess to determine delivery needs and requests a level of delivery handling, such as requesting fast delivery, to the shop based on selected criteria, such as portions on order hitting a particular threshold of product shortage. Other portions of the order can be shipped at a different level of delivery handling (e.g., bulk shipment, drop-shipped from the warehouse, etc.).

In parallel to state 522, process 500 moves to state 512 where the AOS downloads information to the rep's cell phone suggesting other products for the rep to discuss with the store owner. Advancing to state 514, with a catalog in hand or with an electronic catalog on a computer, the rep shows the products to the store owner, and at the owner's request at a decision state 516, the rep uses the scan-enabled cell phone to scan barcodes associated with the additional product order at state 520. Process 500 then continues to state 522 as previously described. If the store owner or manger decides not to purchase additional products, the dialogue regarding the additional other products ends at state 518.

At the completion of the order creation and shipment information state 522, the AOS follows an order validation, verification and shipping process similar to the one described in conjunction with FIG. 3 above. Proceeding to state 524, the AOS sends the order to the fulfillment center 460 (FIG. 4) and the retailer account is charged. The AOS uses existing billing processes to process charges associated with the transaction, such as via the retail account subsystem 480. Continuing at state 526, the fulfillment center ships the ordered products via the delivery service 470, and the retail location receives the order. In certain embodiments, the AOS 450 provides a receipt or other response to the wireless communication device 410.

Figure 6:
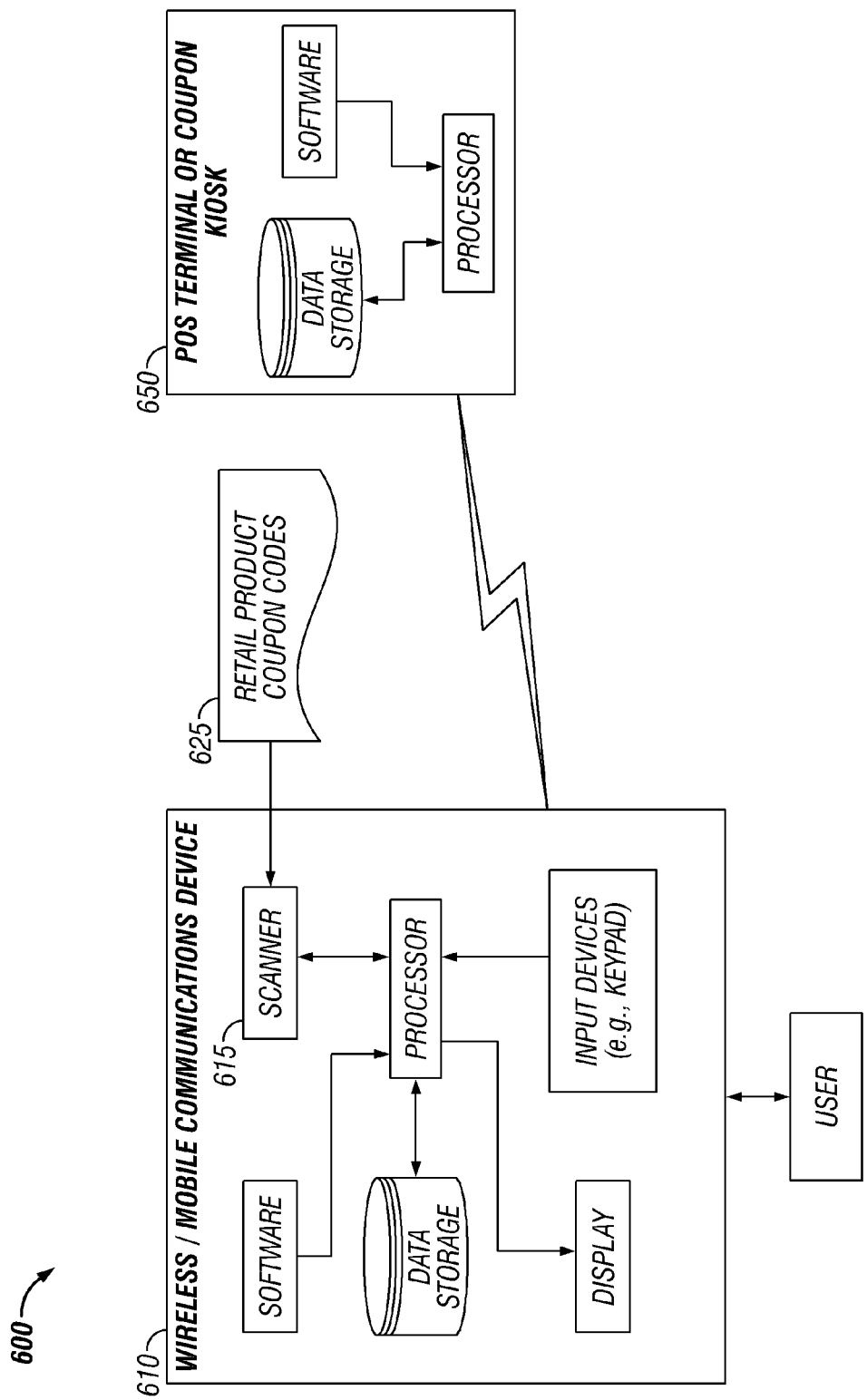
FIG. 6 is a block diagram of a coupon barcode scan and redemption embodiment of the system and method.

Referring to FIG. 6, an example system 600, such as to illustrate a third scenario, will be described. A wireless computing device 610 utilized by a user or customer includes a scanner 615 used to scan retail product coupon codes 625 or other similar information. The coupon codes 625 can be located on coupons (such as in magazines, newspapers, brochures, etc.), in articles, on signage, in electronic mail, or even downloaded from the Internet. Other components of the wireless communication device 610 are similar to that described in conjunction with the wireless communication device 210 of FIG. 2. The wireless communication device 610 communicates the data indicative of the scanned information of the information source via wireless communication to a point of sale (POS) terminal or coupon kiosk 650. The POS terminal 650 receives the data from the wireless communication device 610 and processes the data so as to provide a discount or provide a rebate to the user.

Figure 7:
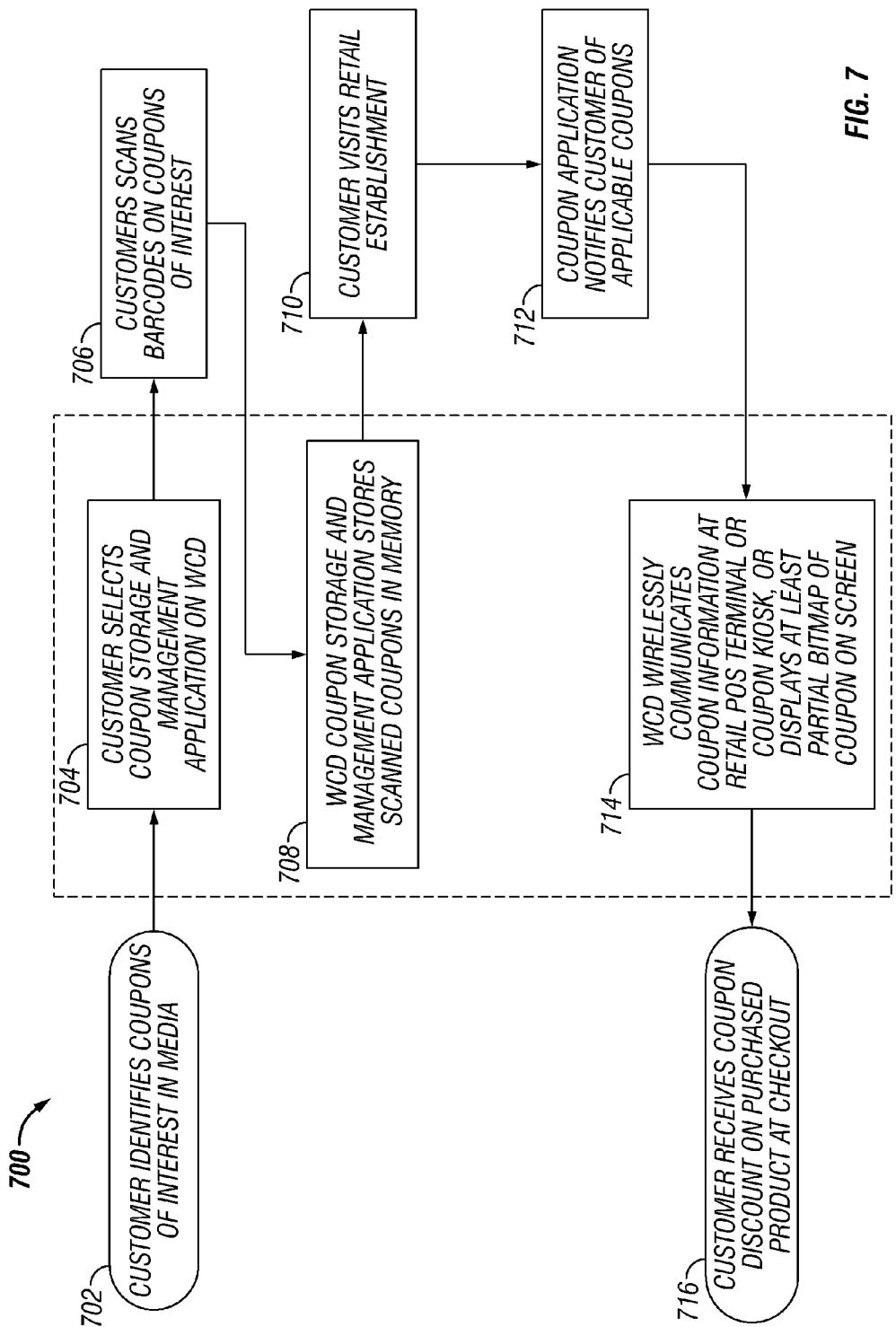
FIG. 7 is a flowchart of an exemplary process for operating the embodiment shown in FIG. 6.

Referring to FIG. 7, a flowchart of an exemplary process 700 for operating the example system shown in FIG. 6 will be described. In the third scenario, the system 600 (FIG. 6) performs the process 700 for coupon redemption.

Beginning at state 502, a customer identifies coupons of interest in media. A coupon as used herein can include an advertisement, an article, etc. that describes a product or service and includes a code, number, barcode or other identifier that correlates a discount with the product or service. The discount can be a 100% discount for a free product or service. The advertisement, article, etc. can be in electronic format or printed, and can include signage at the point of display at a business. Proceeding to state 704, the customer selects a coupon storage and management application on the wireless communication device 610 (FIG. 6).

Advancing to state 706, the customer reads a newspaper (or other hard copy, or even electronic copy) and scans coupon barcodes that they may want to use into their cell phone or other portable computing device. Moving to state 708, the cell phone stores the coupon codes or barcodes in a small coupon storage application (includes plain language description and other details such as product name, value, expiration date, etc. in certain embodiments). The application makes it easy for the customer to access the coupons when needed, such as when they visit a retail establishment at state 710, delete out-of-date coupons, and can even prompt a customer that they have a coupon for a similar product that they are about to purchase as at state 712. Two examples follow:

Example 1—Grocery Store Coupons:
    The customer reads the Sunday paper and downloads barcodes for coupons of items they may decide to purchase.
    The customer goes to the grocery store and as they select the type of products they want—for example Mr. XXX Spaghetti, they use their scan-enabled cell phone or computing device and scan the product barcode. The cell phone text messages back that they have a coupon for Mr. YYY Spaghetti at state 712 and the customer makes a decision to use the product with the coupon.

After completing their shopping, the customer goes to the checkout line and uses the cell phone or computing device wireless communication capability to transmit the barcodes of the coupons they have stored in their telephone to the checkout system at state 714. That system adjusts the price based on the applicable coupon at state 716. An alternative embodiment of state 714 can display the coupon on a display screen of the telephone or computing device for redemption by either a checkout clerk or the POS.

Example 2—For Coupons with Mail-in-Rebates:

The customer follows a similar scenario as in Example 1 above. However, instead of an immediate discount, in this case a company mails a rebate to the customer.

When the customer purchases an item, the customer gets the necessary purchase verification data for the mail-in rebate at the time of purchase from 1) scanning the barcode on the purchased item and/or from a wireless transmission from the cash register to the customer's cell phone (information can include data such as purchase receipt, the UPC code, date of purchase, etc.). The cell phone stores this information along with a telephone number obtained by scanning the product's barcode for connecting to the rebate center.

After the shopping transaction is completed, the cell phone prompts the customer to call the rebate center to submit the rebate information. The customer can place the call then or wait until later. Upon prompting for where to mail the rebate, the customer provides an address stored in the cell phone and, as directed by the customer, the rebate center mails the rebate or activates an electronic funds transfer (EFT).

Figure 8:
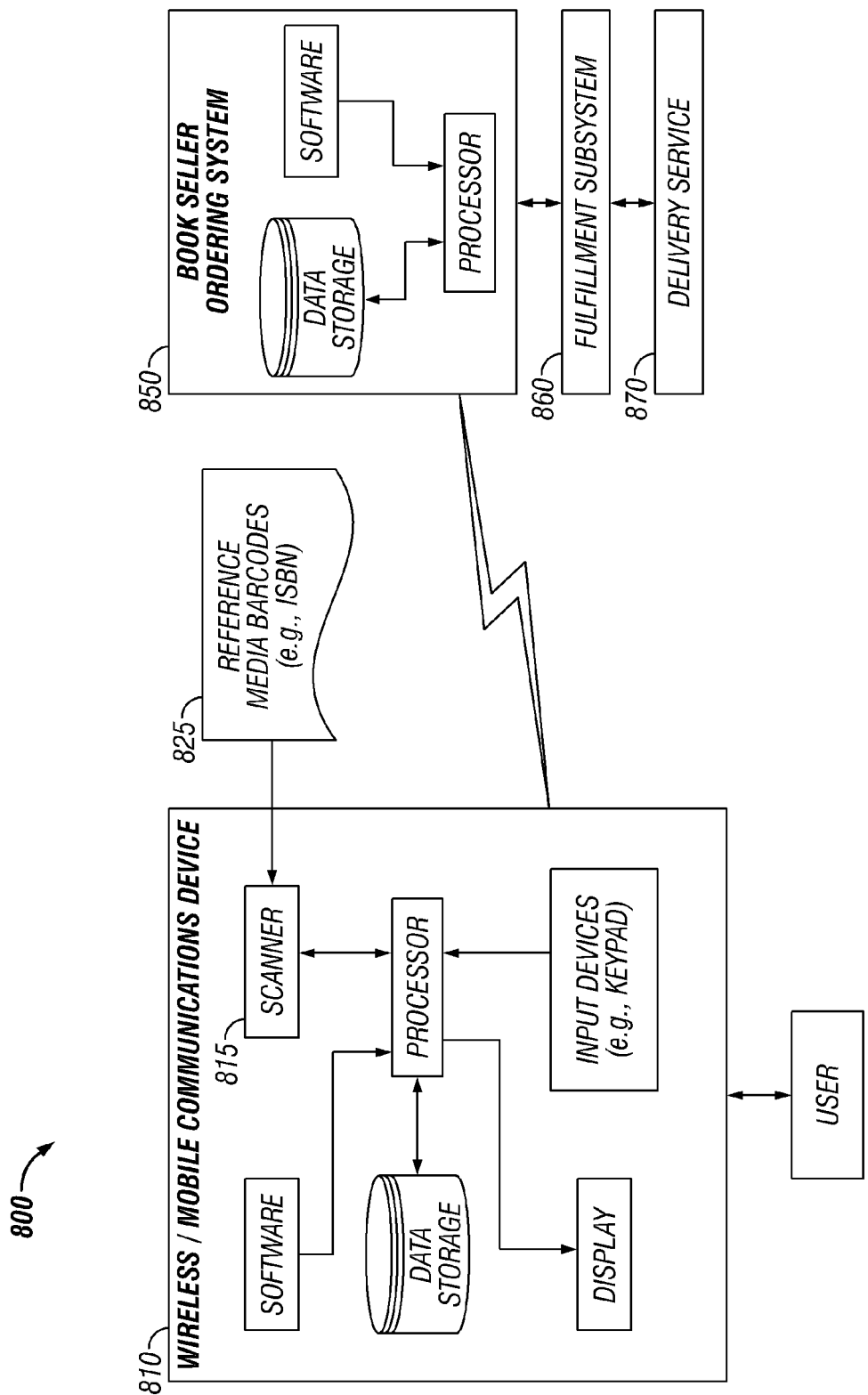
FIG. 8 is a block diagram of an information barcode scan and ordering embodiment of the system and method.

Referring to FIG. 8, an example system 800, such as to illustrate a fourth scenario, will be described. A wireless computing device 810 utilized by a user or customer includes a scanner 815 used to scan reference media codes 825 or other similar information. The codes 825 can be international standard book number (ISBN) codes, for example. Other components of the wireless communication device 810 are similar to that described in conjunction with the wireless communication device 210 of FIG. 2. The wireless communication device 810 communicates the data indicative of the scanned information of the information source via wireless communication to a publication or book seller ordering system 850. The ordering system 850 receives the data from the wireless communication device 810 and processes the data. The ordering system 850 provides information to a fulfillment subsystem 860 so as to effect the delivery of one or more publications corresponding to the information received by the ordering system via a delivery service 870. In certain embodiments, the delivery service is the U.S. Postal Service.

Referring to FIG. 9, a flowchart of an exemplary process 900 for operating the example system shown in FIG. 8 will be described. In the fourth scenario, the system 800 (FIG. 8) performs the process 900 to obtain coded data for later use such as ordering publications.

Beginning at state 902, a student/researcher/reader finds references at the back of a book or other publication for other sources of information that he/she wants to purchase. The references can include the Library of Congress catalog information and an associated barcode. Proceeding to state 904, the reader selects a scanning software application on the wireless communication device 810 (FIG. 8). Advancing to state 906, rather than the student/researcher recording this information manually, the cell phone application prompts the student/researcher to scan the information, such as ISBN, into their cell phone. The wireless communication device 810 stores the scanned information in the data storage at state 908.

Continuing at state 910 at a later time, the student/researcher goes to an on-line bookstore. The cell phone application, using wireless communication, performs an on-line ordering procedure and sends the bar-coded information to populate the product field. Proceeding to state 912, previously described ordering procedures are followed, such as described in conjunction with FIG. 3 above. The customer confirms the order at state 914 and selects the shipping address. The customer selects a level of delivery service at state 916. Alternatively, when the ACC asks how the student/researcher would like delivery, the cell phone application populates that data field too, including shipping by a USPS special service such as Priority mail, first class or some other service. Advancing to state 918, the ordering system 850 (FIG. 8) sends the order to the fulfillment subsystem 860, which ships the order via the selected delivery service 870 at state 920. The customer then receives the ordered publications. In certain embodiments, the ordering system 850 provides a receipt or other response to the wireless communication device 810.

Other examples of using the systems described above are as follows:

The information from a scanned barcode can be used to access a website either directly from the wireless communications device (e.g., cell phone, PDA) which decodes the barcode and converts to a URL address, or via a server that decodes the barcode and converts the decoded information to a URL address. This can be used to order merchandise, download coupons, etc.

A scanned URL is used (such as via OCR) to access a website directly from the wireless communications device. This can be done to order merchandise, download coupons, etc.

Scanned or downloaded coupons can be stored in the wireless communication device as a whole or partial bitmap, or as a coupon code/number. Then, at a business POS, the whole or partial bitmap is displayed on the wireless communication device screen or the coupon code/number is wireless transmitted to the POS.

The wireless communication device is used to scan barcode on signs at point of arrival for public transportation (e.g., train, bus, airplane). The barcode contains telephone number or other communication code and location information of arrival point to contact different public transportation type (e.g., limousine) for pickup.

The wireless communication device uses a RFID scanner to scan active or passive tags. With an active tag, the system can limit a particular store location to a specified number of total coupon scans and/or one scan for a particular wireless communication device for the particular coupon.

CONCLUSION

While specific blocks, sections, devices, functions and modules may have been set forth above, a skilled technologist will realize that there are many ways to partition the system, and that there are many parts, components, modules or functions that may be substituted for those listed above.

While the above detailed description has shown, described, and pointed out the fundamental novel features of the invention as applied to various embodiments, it will be understood that various omissions and substitutions and changes in the form and details of the system illustrated may be made by those skilled in the art, without departing from the intent of the invention.

What is claimed is:

1. A coupon code scanning and processing system, comprising:
   a wireless computing device comprising:
      a scanner configured to scan a coupon, and an item code, the coupon relating to an item, and the item code identifying an item;
      a memory configured to store data indicative of the coupon and to store data associated with the coupon, the stored data associated with the coupon comprising a whole or partial bitmap of the coupon and a coupon code;
      a processor configured to receive the item code and to determine whether data indicative of a coupon code relating to the item identified by the item code is present in the memory and wherein the processor character recognizes the coupon to identify a coupon code;
      wherein the processor is further configured to provide a notification if data indicative of a coupon code relating to the item identified by the item code is present in the memory; and
   an automated processing subsystem configured to receive the coupon code from the wireless computing device and to provide the benefit associated with the coupon corresponding to the data associated with the coupon during a transaction involving the item identified by the item code,
   wherein the stored coupon code is indicative of a uniform resource locator address for a network resource accessed by the wireless computing device to obtain the data associated with the coupon, and
   wherein the processor additionally accesses a network resource addressed by the uniform resource locator address and obtains data associated with the coupon.

2. The system of claim 1, wherein the coupon corresponds to a retail product.

3. The system of claim 1, wherein the code comprises a barcode.

4. The system of claim 1, wherein the wireless computing device has a mobile wireless cellular or personal communications service voice capability and belongs to a customer.

5. The system of claim 1, wherein the automated processing subsystem is a point of sale terminal or a coupon kiosk.

6. The system of claim 1, wherein the scanning of the coupon is performed outside of a business having the automated processing subsystem.

7. The system of claim 1, wherein the scanning of the coupon is performed on an electronic signage display of a coupon at a point of display in a business.

8. The system of claim 1, wherein the coupon comprises a code.

9. The system of claim 1, wherein the automated processing subsystem is located in a retail business location.

10. The system of claim 1, wherein the wireless computing device notifies the user of the device of applicable coupons.

11. The system of claim 1, wherein the wireless computing device transmits the data to the automated processing subsystem via a Bluetooth or infrared protocol.

12. The system of claim 1, wherein the wireless computing device transmits the data to the automated processing subsystem via a cellular or personal communications service protocol.

13. The system of claim 1, wherein the benefit is a discount on a product or service.

14. The system of claim 1, wherein the automated processing subsystem receives the whole or partial bitmap of the coupon.

15. The system of claim 1, wherein the processor is further configured to provide a notification if data indicative of a coupon code related to an item similar to, but distinct from, the item identified by the item code is present in the memory.

16. The system of claim 1, wherein the benefit is a mailed rebate.

17. The system of claim 1, additionally comprising an RFID scanner to limit coupon scans.

18. A coupon code scanning and processing method using a mobile computing device having a scanner, the method comprising:
   receiving a coupon scanned via the mobile computing device, the coupon relating to an item;
   receiving an item code scanned via the mobile computing device, the item code identifying an item, wherein the scanning of the item code is performed at a location of a product or service in a business;
   character recognizing the coupon to identify a coupon code;
   storing data indicative of the coupon code in a memory of the mobile computing device;
   storing data associated with the coupon in the mobile computing device, the stored data associated with the coupon comprising a whole or partial bitmap of the coupon;
   searching the memory to determine whether data indicative of a coupon code relating to the item identified by the received item code is present in the memory;
   providing a notification if the data indicative of a coupon relating to the item identified by the received item code is present in the memory;
   transmitting the data indicative of the coupon code to an automated processing subsystem via a wireless protocol so as to receive a benefit associated with the coupon corresponding to the data associated with the coupon code,
   wherein the stored data indicative of the coupon code is indicative of a uniform resource locator address for a network resource accessed by the mobile computing device to obtain the data associated with the coupon, and
   wherein the mobile computing device additionally accesses a network resource addressed by the uniform resource locator address and obtains data associated with the coupon.

19. The method of claim 18, wherein the benefit is a discount on a product or service.

20. The method of claim 18, wherein the code comprises a barcode.

21. The method of claim 18, wherein the automated processing subsystem receives the whole or partial bitmap of the coupon.

22. A coupon scanning and processing method using a mobile computing device having a scanner and a display screen, the method comprising:
   scanning a coupon via the mobile computing device at a non-point of sale location;
   character recognizing the coupon to identify a coupon code;
   storing data indicative of the coupon code in a memory of the mobile computing device, the coupon code relating to an item;

storing data associated with the coupon, the stored data associated with the coupon comprising a whole or partial bitmap of the coupon;

scanning an item code at a point of sale location, the item code identifying an item;

searching the memory to determine whether the data indicative of a coupon code relating to the item identified by the scanned item code is present in the memory;

providing a notification if data indicative of a coupon code relating to the item identified by the scanned item code is present in the memory;

displaying at least a portion of the whole or partial bitmap of the coupon, including the data associated with the coupon, and the code on a screen of the mobile computing device; and using the displaying of the at least a portion of the coupon including the data associated with the coupon and the code on a screen of the mobile computing device to receive a benefit associated with the displayed at least a portion of the coupon at a point of sale terminal, wherein the stored data indicative of the coupon code is indicative of a uniform resource locator address for a network resource accessed by the mobile computing device to obtain the data associated with the coupon, and wherein the mobile computing device additionally accesses a network resource addressed by the uniform resource locator address and obtains data associated with the coupon.

23. The system of claim 22, wherein the benefit is a discount on a product or service.

24. The method of claim 22, wherein the displayed at least a portion of the coupon is scanned at the point of sale terminal.

25. The method of claim 22, wherein data associated with the displayed at least a portion of the coupon is manually entered at the point of sale terminal.

26. The method of claim 22, wherein the scanning of the coupon is performed at a display location of a product or service in a business.

27. A coupon code scanning and processing system having a mobile computing device, the system comprising:

means for receiving a scanned coupon, wherein the scanning of the coupon is performed at a location of a product or service in a business;

means for character recognizing the coupon to identify a coupon code;

means for storing data indicative of the coupon code in a mobile computing device;

means for storing data associated with the coupon in the mobile computing device, the coupon relating to an item, the stored data associated with the coupon comprising a whole or partial bitmap of the coupon;

means for receiving a scanned item code, the item code identifying an item, wherein the scanning of the item code is performed at the location of the product or service in the business;

means for searching the stored data for data indicative of a coupon code relating the item identified by the received item code;

means for providing a notification if data indicative of a coupon code relating to the item identified by the item code is stored in the memory; and means for transmitting the data to an automated processing subsystem via a wireless protocol so as to receive a benefit associated with the coupon corresponding to the data associated with the coupon code, wherein the stored data indicative of the coupon code is indicative of a uniform resource locator address for a network resource accessed by the mobile computing device to obtain the data associated with the coupon, and wherein the mobile computing device additionally accesses a network resource addressed by the uniform resource locator address and obtains data associated with the coupon.

\* \* \* \* \*

UNITED STATES PATENT AND TRADEMARK OFFICE
CERTIFICATE OF CORRECTION

| | | |
|---|---|---|
| PATENT NO. | : 8,925,810 B2 | Page 1 of 1 |
| APPLICATION NO. | : 13/607507 | |
| DATED | : January 6, 2015 | |
| INVENTOR(S) | : Gary C. Reblin | |

It is certified that error appears in the above-identified patent and that said Letters Patent is hereby corrected as shown below:

In the Claims

In column 15 at line 28, In Claim 23, change "system" to --method--.

Signed and Sealed this
Fifteenth Day of September, 2015

Michelle K. Lee
*Director of the United States Patent and Trademark Office*